US009251679B2

(12) United States Patent
Wandel et al.

(10) Patent No.: US 9,251,679 B2

(45) Date of Patent: Feb. 2, 2016

(54) METHOD AND A SYSTEM FOR MONITORING THE HANDLING OF AN OBJECT

(75) Inventors: Sten Wandel, Lund (SE); Mats Johnsson, Lund (SE)

(73) Assignee: TAMPERSEAL AB, Lund (SE)

( * ) Notice: Subject to any disclaimer, the term of this patent is extended or adjusted under 35 U.S.C. 154(b) by 67 days.

(21) Appl. No.: 14/238,920

(22) PCT Filed: Aug. 16, 2012

(86) PCT No.: PCT/SE2012/050878

§ 371 (c)(1), (2), (4) Date: Feb. 20, 2014

(87) PCT Pub. No.: WO2013/025167

PCT Pub. Date: Feb. 21, 2013

(65) Prior Publication Data

US 2014/0210624 A1 Jul. 31, 2014

Related U.S. Application Data

(60) Provisional application No. 61/524,398, filed on Aug. 17, 2011.

(30) Foreign Application Priority Data

Aug. 16, 2011 (SE) ...................................... 1150746

(51) Int. Cl.

*G08B 13/14* (2006.01)
*G08B 13/24* (2006.01)
(Continued)

(52) U.S. Cl.

CPC ........ *G08B 13/2402* (2013.01); *E05B 73/0017* (2013.01); *G06Q 10/06* (2013.01); *G06Q 10/087* (2013.01); *G08B 1/08* (2013.01); *G08B 13/1427* (2013.01); *G08B 13/1436* (2013.01); *G08B 13/1481* (2013.01); *G08B 13/2408* (2013.01); *G08B 13/2417* (2013.01);
(Continued)

(58) Field of Classification Search

None
See application file for complete search history.

(56) References Cited

U.S. PATENT DOCUMENTS 5,068,643 A 11/1991 Yashina
7,659,816 B2 2/2010 Wandel
(Continued)

FOREIGN PATENT DOCUMENTS

DE 19822670 11/1999
WO 2009004391 1/2009

OTHER PUBLICATIONS

International Search Report and Written Opinion from corresponding International Application No. PCT/SE2012/050878, mailed on Apr. 4, 2013.

*Primary Examiner* — Travis Hunnings

(74) *Attorney, Agent, or Firm* — Renner, Otto, Boisselle & Sklar, LLP.

(57) ABSTRACT

A method, a system and a device for monitoring the handling of an object. The method includes the steps of attaching a device to said object, sensing variations of light radiation transmitted between said device and a first external unit arranged outside the proximity of said object, sensing variations of radio waves transmitted between said device and a second external unit arranged outside the proximity of said object, determining handling events of said object on the basis of a combination of said variations of light radiation and said variations of radio waves, and signaling information from said device relating to said handling events.

18 Claims, 7 Drawing Sheets

FIXED CONTROL UNIT 32
MOBILE CONTROL UNIT 34
SERVER 26
EXTERNAL VIDEO SYSTEM 28
NODES 24
ALARM DEVICES 30
NODES 24
36 LIGHT RADIATION
RADIO ENERGY
10
20
22
38

(51) Int. Cl.

| | |
|---|---|
| ***E05B 73/00*** | (2006.01) |
| ***G06Q 10/06*** | (2012.01) |
| ***G08B 1/08*** | (2006.01) |
| ***G06Q 10/08*** | (2012.01) |
| ***H04N 7/18*** | (2006.01) |
| *G08B 13/196* | (2006.01) |
| *G08B 15/02* | (2006.01) |
| *G08B 29/18* | (2006.01) |

(52) U.S. Cl.

CPC ....... *G08B 13/2448* (2013.01); *G08B 13/2462* (2013.01); *H04N 7/181* (2013.01); *G08B 13/19676* (2013.01); *G08B 15/02* (2013.01); *G08B 29/186* (2013.01); *G08B 29/188* (2013.01)

(56) References Cited

U.S. PATENT DOCUMENTS

| | | | | |
|---|---|---|---|---|
| 2007/0040683 | A1 | 2/2007 | Oliver et al. | |
| 2007/0171059 | A1 | 7/2007 | Pistilli | |
| 2009/0233735 | A1 | 9/2009 | Savarese et al. | |
| 2010/0277322 | A1 | 11/2010 | Eckert | |
| 2010/0308105 | A1 | 12/2010 | Savarese et al. | |
| 2011/0072132 | A1 * | 3/2011 | Shafer et al. .................. | 709/224 |

* cited by examiner

METHOD AND A SYSTEM FOR MONITORING THE HANDLING OF AN OBJECT

TECHNICAL FIELD

The present invention relates to monitoring of the handling of objects, particularly consumer products in retail stores. One object of the monitoring is to detect and prevent thefts of goods by sending an alarm when the product is placed in Faraday's cage (Booster bag), which blocks the signals from EAS (Electronic Article Surveillance) or RFID (Radio Frequency IDentification) tags and gates. The monitoring may also be used for triggering security alerts for other events, for marketing, and for inventory control.

PRIOR ART

To prevent and detect theft of items from stores, warehouses or during transport different and specific technologies are used such as: guards, video cameras, sealed containers, looked cabinets, EAS (Electronic Article Surveillance) or RFID (Radio Frequency IDentification) tags and gates, devises to detect the disconnection of the EAS/RFID tag from the protected article such as Safers; Keepers; Spider wraps; vacuum packages; and hard tags with pins and ink to reduce the value of the merchandize if the tag is separated from it.

EAS/RFID tags are attached to the item or to its package. These tags are removed or disarmed at the cashier when the product is paid for. Hence, if a customer does not pay, an alarm sounds in the gate, and in some prior art even in the tag, when passing the EAS/RFID antennas in the gate at the store exit. EAS tags comes in different forms, as hard tags on cloths and other unpacked items and soft tags or labels placed inside or on product packages. There are different standards of EAS systems, e.g. RF (Radio Frequency) and AM (Acoustic Magnetic). Also RFID systems have different standards depending on frequencies and protocols.

A description of prior art and some of its draw backs is given in U.S. Pat. No. 5,068,643. It is there proposed a device comprising an optical sensor for the detection of ambient light, a vibration sensor for detecting vibration of a protected article, and an alarm circuit (e.g. a buzzer) coupled to the two sensor for providing an alarm when the optical sensor detects a change in the level of ambient light from relative brightness to relative darkness and the vibration sensor detects a vibration of the protected article. Hence, the device may detect and sound its buzzer when the article is placed in a dark bag or pocket. In one suggested embodiment, the exits of the premises are equipped with devices that emit high frequency light (UV light), which the tag may detect if the article is unpacked or placed in a transparent enclosure. This may prevent the optical detector to trigger a false alarm when the ambient light disappears. When passing an exit the UV light is detected and the tag generates a sound alarm unless it previously has been removed or deactivated by the cashier when paying. However, it is not a crime to place an article in a dark bag or pocket. It is a crime only if the customer does not give the article to the cashier. Hence, many unnecessary alarms will annoy both customers and the personnel.

An alternative way of detecting when an item is illegally removed from the store is disclosed in the patent DE19822670. A transmitter sends out radio signals at set distances into a dedicated and defined zone. A radio receiver is attached to each item to be protected. The radio signals are expected to be received only within the defined zone. The receiver sets off an audio alarm as soon as it cannot receive signals. In another embodiment, an alarm is triggered when the tag enters another defined zone with another radio signal. A combination of both methods is also described.

US20100277322 describes a similar method using an EAS beacon that emits an electromagnetic field that is detected by the security tag in determining to set off an audio alarm in the security tag or to remain dormant. In practice it is very difficult to restrict a radio to receive signals only when within a defined area since the radio waves bounce irregularly, particularly indoors and in the presence of metal shelves. Hence, theft alarms relying on the strength of radio reception alone are rarely used.

US 20110072132 describes a retail product tracking system that simultaneously may support inventory, marketing, and security functionality. It utilizes and manages a network consisting of servers, routers, monitoring devices (tags), ping nodes (for positioning), and override devices (for deactivation). In some embodiments the monitoring device contains sensing devices configured to detect motion, light, images, sound, tampering or other environmental stimuli. The light detection can be used to detect if the article has been placed underneath someone's jacket or within a bag. However, since the same technique is appearing as in the above described U.S. Pat. No. 5,068,643, the system has the same drawbacks.

Shoplifters have developed several techniques and scams to defeat security techniques and procedures. One is to remove the EAS or RFID tag from the package or the package with the tag from the product and walk out with the un-alarmed product. Manufacturers and retailers therefore try to prevent and detect the separation of the tag from the item by packing the item in a hard to open primary package, e.g. clam shell or Oyster pack. Alternatively retailers add an outer hard transparent box (Safer or Keeper) or put lanyards around the primary pack that are attached to a puck containing an EAS tag and an alarm device which provides a high sound if a lanyard is cut off or when the package with the device passes the EAS gate, e.g. the 3 way alarm Spider Wrap.

A new approach to prevent that the thief removes the package with the EAS tag or only the EAS tag and walk out with the un-alarmed product is disclosed in U.S. Pat. No. 7,659,816 where the product with an EAS or RFID tag is placed in a gas-tight plastic bag together with an alarm module containing a vacuum sensor, processor and a radio and the bag is vacuum sealed. When the package is opened the vacuum disappears and the radio in the tag sends an alarm to an external receiver that in its turn enables an alarm siren, light, camera and initiates other security actions.

Potential thieves use several strategies and tools to compromise these loss prevention devices. An increasingly common method to defeat the EAS or RFID alarm is to shield the tag from the interrogating electromagnetic signals from the reading antennas for EAS or RFID tags placed at the gates of the store and thereby blocking the tag to respond and reveal its presence. The product with its theft tag still attached is placed into a "booster bag", which is a standard shopping bag clad on the inside with multiple layers of aluminium foil or other electricity conducting material to block the radio signals. Foil lined pockets or liners on jackets serve the same purpose. When an article with a tag attached is placed in the bag and the opening of the bag is closed, it works as a Faraday's cage and prevents electromagnetic waves to penetrate from the outside and in and considerable attenuates electromagnetic emission from the inside.

Some retailers try to make it more difficult for the thief to use booster bags by forbidding customers to bring shopping bags into the store, which however is cumbersome for both personnel and honest customers and requires lockers outside the EAS gates. Another countermeasure is to place metal detectors at the entrance and exit of the store. However. However, these too frequently generate false alarms from e.g. perambulators, wheel chairs, umbrellas, metal in the cloths or pockets, or when doors with metal frames nearby are being opened or closed. They may detect large booster bags bud rarely prepared pockets or coats.

SUMMARY OF THE INVENTION

The invention relates to a method, a system and a device for monitoring the handling of an object, particularly to detect when a consumer product in a retail store is placed in a Faraday's cage (Booster bag) that blocks the signals from EAS or RFID tags and gates.

To solve the drawbacks set forth above, the present invention proposes a highly reliable method to monitor, to detect and to notify personnel and guards when a protected merchandize or other object is handled in an inappropriate way such as placing it in a "booster bag". In various embodiments the method eliminates most false and missed alarms compared to prior art by method triangulation and advanced information and signal processing. Light and radio waves have different physical properties and penetrate through and reflect in material very differently, which here is used to increase the specificity in the assessment of the material affecting light waves and radio waves in the proximity of the object. The material may partly block the radio and light signals being transmitted to or from the object being protected, which can be measured as a reduction in received energy intensity. Light and radio signals sent from the object may partly bounce on the material, which can be measured as a reduction in received energy intensity.

In various embodiments data are collected continuously, in a duty cycle or when interrogated from light sensors and radio receivers sensing characteristics of light radiation signals and radio wave signals being transmitted to or from a tag firmly attached to the object being protected. A signal profile is continuously determined using a signal analysis algorithm and the collected data. The signal profile will reflect the handling of the object or specific sequence of handling events and is used to signal information about the handling event. Specific handling events can be monitored in advance and signal profiles reflecting them can be stored and later compared to actual events. In practice, the tags and other parts of the system are programmed during their production with analysis algorithms and a database of profiles matching specific handling events. When the system is in operation the database and the algorithms could be calibrated and updated.

Hence, collected data in time series is compared with typical time series caused by predetermined events that are stored in the database. Thereby, the most probable event that the object currently is involved in can be estimated and it is possible to discriminate between when the object is being placed in a Faraday's cage (booster bag), in an ordinary bag, in a hand or handled in other ways.

In all embodiments a device (tag, monitoring device) is firmly attached to or attachable to the object being monitored. It contains different elements such as light sensitive detector and/or light source, radio receiver and/or transmitter, and signalling means. Raw data from the light detector and the radio is analysed to determine which specific type of handling event is occurring. These processes are performed within the tag or in one or several external devices (receivers, nodes, routers) or other devices further downstream an information chain such as in computer servers. The processes include computer program products that contain algorithms, e.g. artificial neural network algorithms for training the system to recognize specific sequences of handling events and then analyzing the time sequences of collected radio and light sensor data to identify what type of handling event is occurring. This information is then presented to personnel, guards and other security systems as video surveillance for further actions.

The invention is intended for monitoring both legitimate and illegitimate events and sequences of events. Examples of legitimate events are: a customer in the shop lifts a product in order to inspect it before deciding to buy it, and an employee taking the product out from a transport container and placing it on a self in the store. Both events are of interest to monitor and record for later analyses in order to e.g. improve the display of merchandizes and monitoring that the products are displayed according to the instructions from the marketing department. Examples of illegitimate events are: placing a product in a "booster bag, booster pocket or booster jacket liner" and an employee colludes with the thief by not scanning the product at the cashier. Some events are in between, e.g. placing a product in a pocket or in a personal bag. This is not an illegal event in itself, but may require further observation by the video system or questions to the customer by a sales representative or the cashier.

The system can preferably be an add-on to traditional EAS, video surveillance and other technologies described above and elsewhere, which prevents and detects persons from removing items from stores without paying.

In some embodiments the tag also contains other sensors, a processor, a memory, an alarm generator (sound, light, vibration etc), and a battery or other energy source. Either the tag is a standalone system with its own means to analyze data, and in some embodiments even take action, or it sends its raw sensor data to an external device that makes the analyzes and sends an alarm or alert information to other devices as a server, an alarm, a fixed or mobile display and control unit, or to the user of the system for further action. In some embodiments the tag itself take actions of its own, e.g. generated sound, light, or vibration; mark or destroys the value of the object by spraying ink or similar; or mark the person handling the object with smelly liquid, ink or synthetic DNA.

The changes in sensor data may be caused by several different events. The object may be moved from one external environment to another, e.g. from a corrugated paper box to a shelf in a store room, from the store room to a shelf in the store, from the shelf to a customer fitting room, from the fitting room or directly from the shelf into a legitimate shopping basket/cart/bag, or into illegitimate booster bag/pocket/liner. Other causes of the changes may be that ambient background light and/or radio radiation in the vicinity of the object have changed, or that another product is placed in front of the object being protected or removed therefrom. The processor arranged in the tag, in the node (external alarm receptor module) or elsewhere analyses the received sensor information in order to call attention and initiate further actions.

The tag can may be provided with a radio unit operating as a receiver that receives ambient radio signal or signals from a dedicated transmitter, which may be placed in an external node, e.g. in the nodes that also communicates with the signalling means in the tag. In various embodiments the radio unit in the tag is a transmitter and a receiver is placed in an external node.

The tag may be provided with a radio unit operating as a receiver that receives ambient radio signal or signals from a dedicated transmitter, which may be placed in an external node, e.g. in the nodes that also communicates with the signaling means in the tag. In various embodiments the radio unit in the tag is a transmitter and a receiver is placed in an external node.

The node may receive data from the light and radio sensor in the tag and then analyses both to detect patterns typical of a specific event. Alternatively the node sends both the light and radio data to the central control unit for analyses. The node could also send the characteristic of the received radio and/or light signal to the tag, and the tag then analyses the data.

In various embodiments the radio in the tag is a transceiver, which makes it possible to send an acknowledge signal back to the sending device and if no acknowledgement signal is received, the sending device may chose another radio channel or other means until successful transmission has been verified. If no transmission is established, it is an indication that the tag is in a Booster bag or left the coverage of the radio channel or that the radio is not working because of too week battery, it is broken or tampered with.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
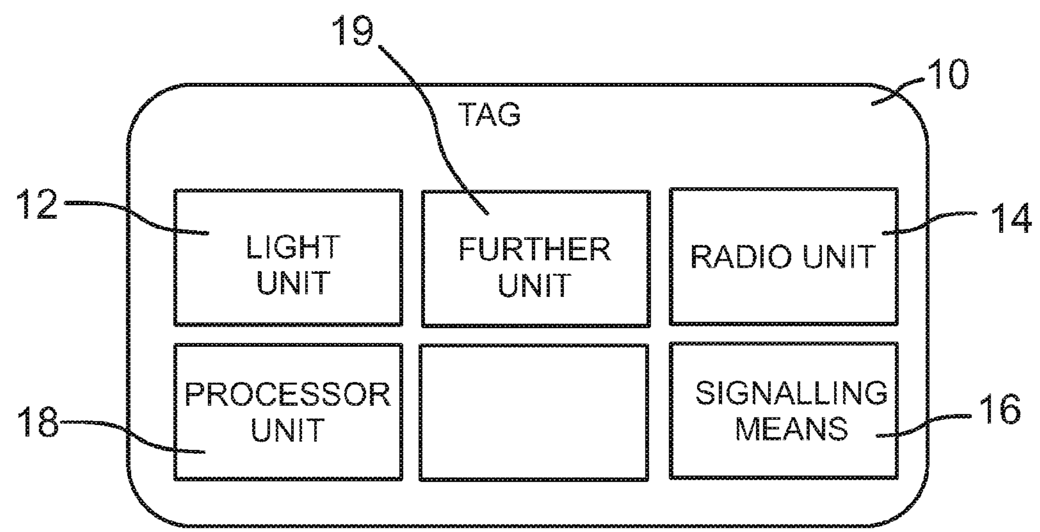
FIG. 1 is a schematic view of a device used in one embodiment of a system in accordance with the invention.

FIG. 1 shows the elements of a basic tag 10 that is used in the system in accordance with the invention. The tag 10 comprises a light unit 12, a radio unit 14 and signalling means 16. In various embodiments the radio unit is a receiver arranged to receive radio signals from an external source. In various other embodiments the radio unit 14 is a transmitter capable of transmitting radio signals at least repeatedly to an external receiver of the system. In yet other embodiments the radio unit is a transceiver capable of both transmitting radio signals to an external receiver and receiving radio signals from an external source. In a similar way, the light unit 12 is a transmitter capable of transmitting light signals at least repeatedly to an external light sensor. In yet other embodiments the light unit is a transceiver capable of both transmitting light signals to an external light sensor and receiving light signals from an external source. The light unit 12 is, for example, a light sensor that detects and measures light received from an external light source.

In various embodiments of the system the tag 10 also can comprise a processor unit 18 and at least one further unit 19 comprising different elements such as, other types of sensors, means to detect the separation of the tag from the object, a battery or other energy source, and an EAS/RFID tag. An EAS/RFID tag can also be arranged inside the protected object, e.g. inside the product's packaging. The processor unit 18 is provided with analyzing means for analysing signals from the light unit 12 and from the radio unit 14.

Figure 2:
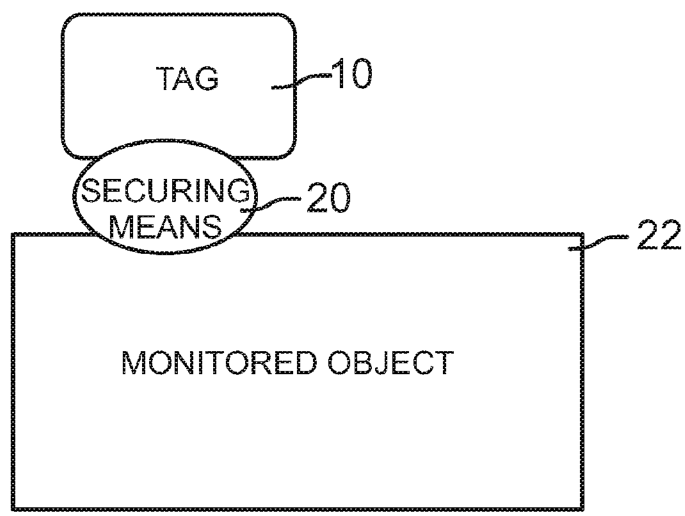
FIG. 2 is a schematic view showing the device of FIG. 1 attached to an object.

FIG. 2 shows securing means 20 for securing the tag 10 to a monitored object 22. It is important that the light unit 12 in the tag not is covered. The securing can in some embodiments be done with hard shells, lanyards, vacuum packaging etc. Devises can be added that prevents and/or indicates and triggers an alarm when the object and the tag are separated.

Figure 3:
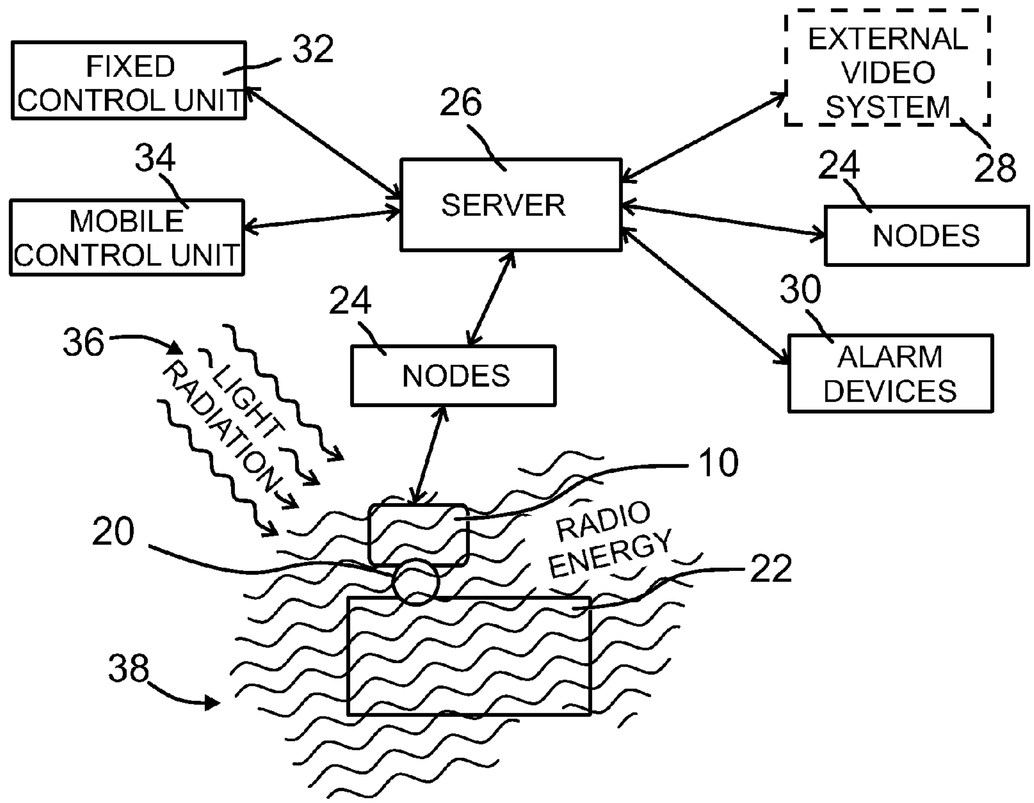
FIG. 3 is a schematic diagram showing different examples of modules of a system in accordance with the invention.

FIG. 3 shows examples of different modules of the system. A plurality of nodes 24, also referred to as receivers or routers, is arranged in the retail store to ensure good radio communication with the signalling means 16 in the tags 10 from all positions of the store. The nodes 24 are operatively connected to a server 26 by wireless or wired means. In various embodiments the server 26 communicates with one or several optional external systems 28 in the store as systems for video surveillance, security, customer behaviour monitoring, cashier, enterprise resource planning, inventory control, and goods reception. The server also communicates with alarm devices 30 (sound, light, vibration, mist etc.), with a fixed control and display unit 32, and with mobile and hand held devices as smart phones 34. The fixed control and display unit 32 and the mobile and hand held devices 34 are arranged to display: type of event, location, type of product, and picture or video, e.g. 10 seconds before and 10 seconds after the event. The server 26 may be provided with a memory where events are stored for later analyses. An area around said tag 10 is exposed to light radiation signals 36 and radio wave signals 38. These signals could be either ambient background or transmitted from dedicated sources preferably with signals having a predetermined pattern so they easily can be distinguished from the ambient background radiation. The server 26 may also comprise pre-analysing means for analysing signals and forming signal profiles. Such signal profiles can be downloaded or transferred to the processor unit 18 of the tag 10. Alternatively, the pre-analysing is performed in another set up before the tags are produced and downloaded as part of manufacturing.

In a basic embodiment, the tag sends at predetermined intervals a radio signal, ping, containing the unique serial number of the object being protected. If the signal strength of consecutive pings is considerable reduced an alert is issued, and if a certain number of expected pings not have been received at all by any receiver node the alarm is triggered. The position of the tag at the last received ping is used for localization.

Figure 4:
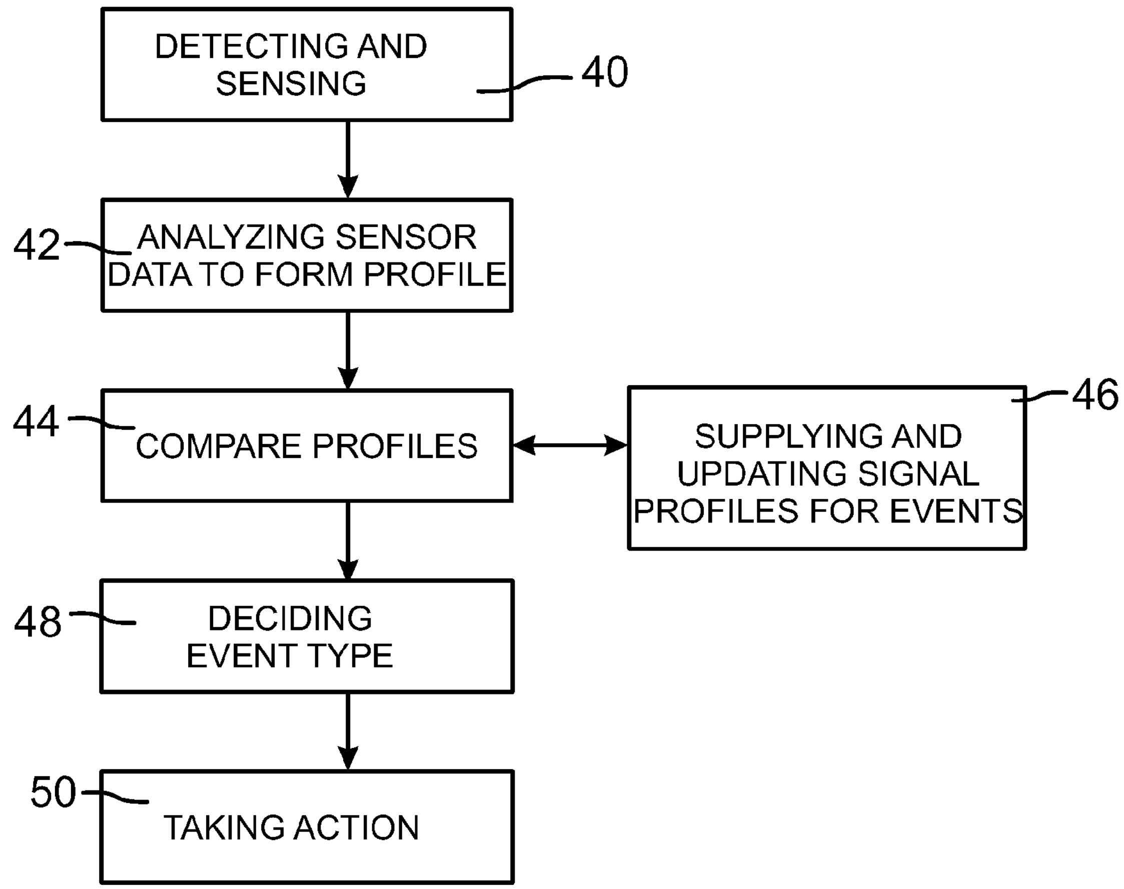
FIG. 4 is a schematic diagram showing examples of process steps performed in the system in accordance with the invention.

FIG. 4 shows the basic process steps of the system. In a first step 40 light radiation signals and radio wave signals are continuously detected and sensed. Variation over time of light and radio characteristics (and those from other potential sensors) are registered, memorized and analysed, either in the tag, in the communication node, in the server or further up in the security system. Sensor data from this step are basically analysed in a second step 42 to form a signal profile. This first analysing step can comprise time analysis of measured signals.

Further analysis is performed in a third step 44 and may comprise comparing the actual sequence with known typical patterns for theft attempts and for normal behaviour by personnel or shoppers when handling a product in the store.

The analyzing means may have a pre-programmed default algorithm and a library of typical patterns for different types of events of special interest, which have been generated by "training" e.g., by repeating each event type many times. Different events correspond to different signal profiles. Preferably, artificial neural network methods or similar know techniques could be used. The default algorithm and library can be further improved by training the tag on the specific object and place in the store, and by successively give feedback at each real incident that occurs. Data stored in a memory means and relating to typical signal profiles for different handling events are supplied and updated in a fourth step 46.

On the basis of data supplied in step 46 and the determination of a signal profile from a current handling event a decision of event type and probability is taken in a fifth step 48. Different types of action can then be taken in a sixth step 50.

In various embodiments sensor data from several tags for the same point in time and located nearby could be analyzed and used to filter out and calibrate for changes in received radiation depending on external and irrelevant events as changes in ambient light or radio intensity. When analyzing the signal sequence from the sensors, the probabilities of several potential events can be accessed as a complement to the information on the most probable event. This could be done by defining windows of sensor data representing specific confidence intervals.

Examples of Events and Actions

The product is placed in a dark bag or pocket. An alert is communicated to the personnel in the cashier place in the store. The personnel then monitor that the person pays for the items in the bag. The process may be enhanced by also alerting the video system for tracking.

The product is placed in a booster bag or pocket. The personnel and guards in the store are alerted in order to apprehend the person holding the bag and inspect it. The process may be enhanced by also alerting the video system for tracking.

A person takes the product in his hand. The time before he replace it or walks away with it could be registered for further analyses to improve product display or other marketing processes.

Further to taking the actions disclosed above also the following steps can be taken. Three or more nodes are used and the signals are analysed in order to determine the coordinates of the tag's location. Then the guard or the personnel will find the thief faster and the video cameras can be directed and zoomed in. A video sequence of 10 seconds before and 10 seconds after the event together with information about the product and location can be transmitted to hand held devices, e.g. smart phones, for further actions. Such video images are also useful for evidence in court and for analyzing similarities among shop lifting attempts.

Figure 5:
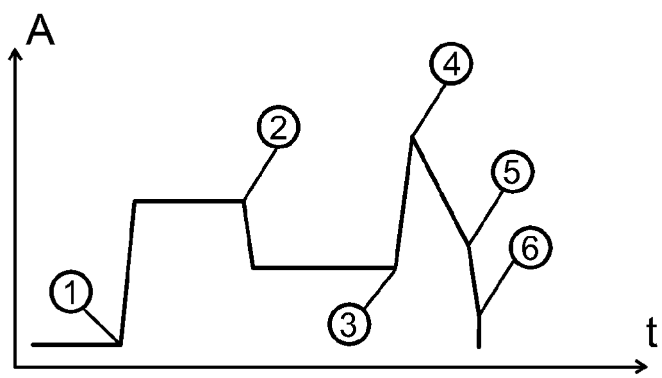
FIG. 5 is a schematic diagram showing light variations in the proximity of the device in FIG. 1 during different events.

FIG. 5 shows examples of how only light sensor data can be analyzed and interpreted as events. The diagram shows variations of light intensity (A) at different time periods (t). In event 1 a monitored object is taken from a closed and covered box and arranged on a shelf. The light intensity increases substantially. In event 2 another object is arranged to partly cover the monitored object and light intensity decreases.

In event 3 the monitored object is removed from the shelf and exposed to more light from ambient light sources. Following this step the monitored object is disposed in a shopping bag och basket in event 4 resulting in a decrease of light intensity. If the bag is provided with walls that are substantially or completely non-transparent to light the event 5 will occur. Finally, in event 6 the bag is closed. However, it is impossible to detect if the opaque enclosure is a booster bag or not.

Figure 6:
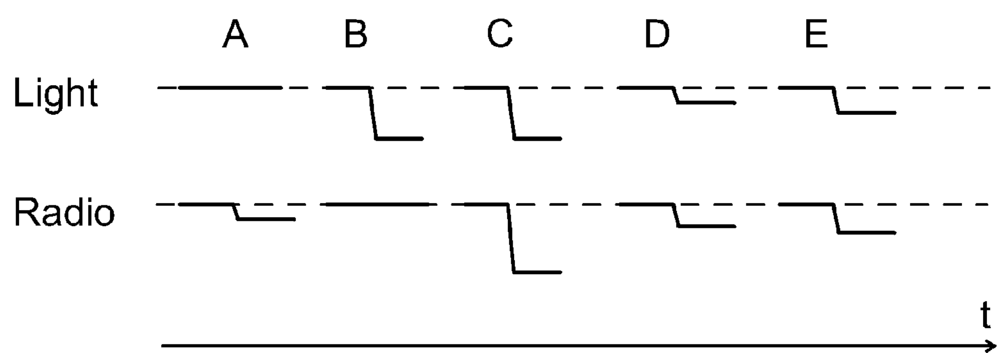
FIG. 6 is a schematic diagram showing light and radio signal variations in the proximity of the device in FIG. 1 during different events.

FIG. 6 shows examples of how radio and light sensor data can be used together to analyze what type of event the object is involved in. The upper graph shows light intensity and the lower graph radio signal strength at different events. At event A (=1 in FIG. 5) the monitored object is placed on a shelf in a store. Light intensity does not change substantially but there could be a decrease in radio signal strength due to absorption in the shelf.

At event B (=3-6 in FIG. 5) the object is disposed in a bag which dramatically changes the intensity of the light measured in the light sensor of the tag. However, there is not a significant change of radio signal strength. At event C (=3-6 in FIG. 5) the product instead is disposed in a booster bag. As a result both light and radio signal levels in the proximity of the tag are substantially decreased. At event D relates to a situation where the monitored object is hold in hand by a person. At event E (=2 in FIG. 5) another object is arranged to partly cover the monitored object, wherein light and radio signal intensity decreases.

Typical signal profiles of specified handling events are determined beforehand and stored in a memory 46. The actual signal profile is then matched with the typical profiles and the probabilities of the most probable events are determined by process 44 and that information is signaled for further action. This method triangulation together with state of the art use of neural network analyzing methods results in high specificity and reliability.

Figure 11:
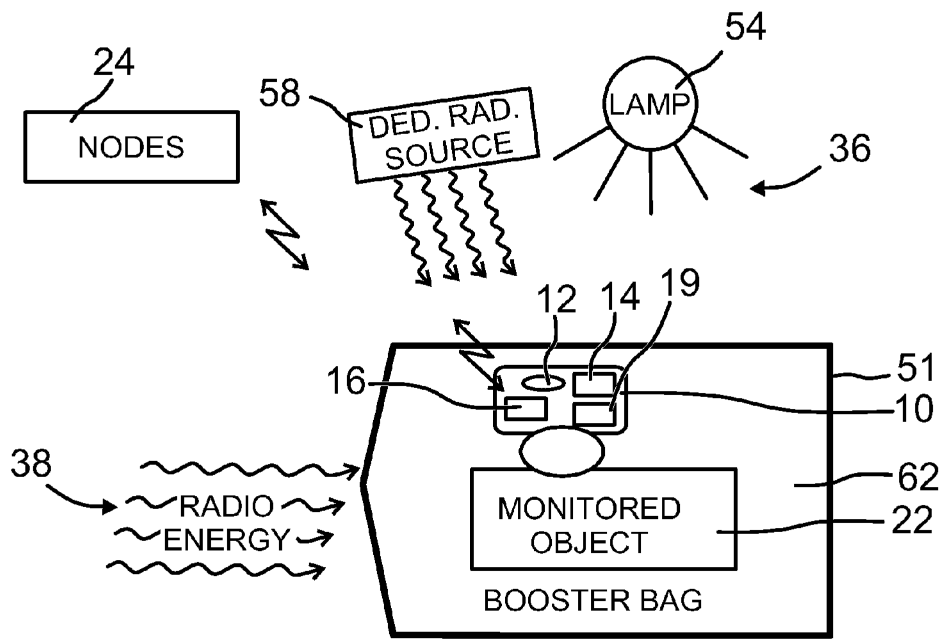
FIG. 11 is a schematic figure showing another alternative embodiment of a system in accordance with the invention.

In the embodiment shown in FIG. 11 a monitored object or product 22 with an attached tag 10 is disposed in a booster bag 51. The tag 10 is provided with a light unit 12 and a unit 14. In addition the further unit 19 in the tag 10 is a motion sensor for detecting movements of the monitored object 22. When the combination of changes in light characteristics, characteristics of the radio energy and movement characteristics detected by the motion sensor 19 correspond to predetermined characteristics, the signaling means 16 is activated, for example, to set off an alarm.

The specificity and sensitivity will improve considerably if one or several dedicated radiation source(-s) 58 with well-defined properties are provided. Such properties could be frequency spectrum and amplitude, e.g. the light source may emit visible light, UV, IR or a combination, and the radio transmitter may emit a specific frequency. The light sensor and the radio receiver in the tag are capable to detect these specific characteristics in order to differentiate the dedicated illumination from the ambient. Light radiation signals 36 are detected and sensed in the light unit 12 of the tag 10.

Several radiation sources with different properties increase the specificity and sensitivity further. Radio signals are received in the tag 10 by a radio unit 14 and light is sensed by the light unit 12. In various embodiments the functionally separated radio unit 14 and the signalling means 16 are combined into one unit. Inside the booster bag 51 the levels of radio and light radiation are substantially lower as depicted by the area 62.

In various embodiments the illumination also contains unique information and signal properties, such as modulation (AM, FM, etc), unique and repetitive pulse sequences, frequency jumping to provide a well defined information in the illumination of the object being protected. The specific information in the illumination may also be used for localization of the product if the illumination is made unique for the particular department and section in the store.

Figure 8:
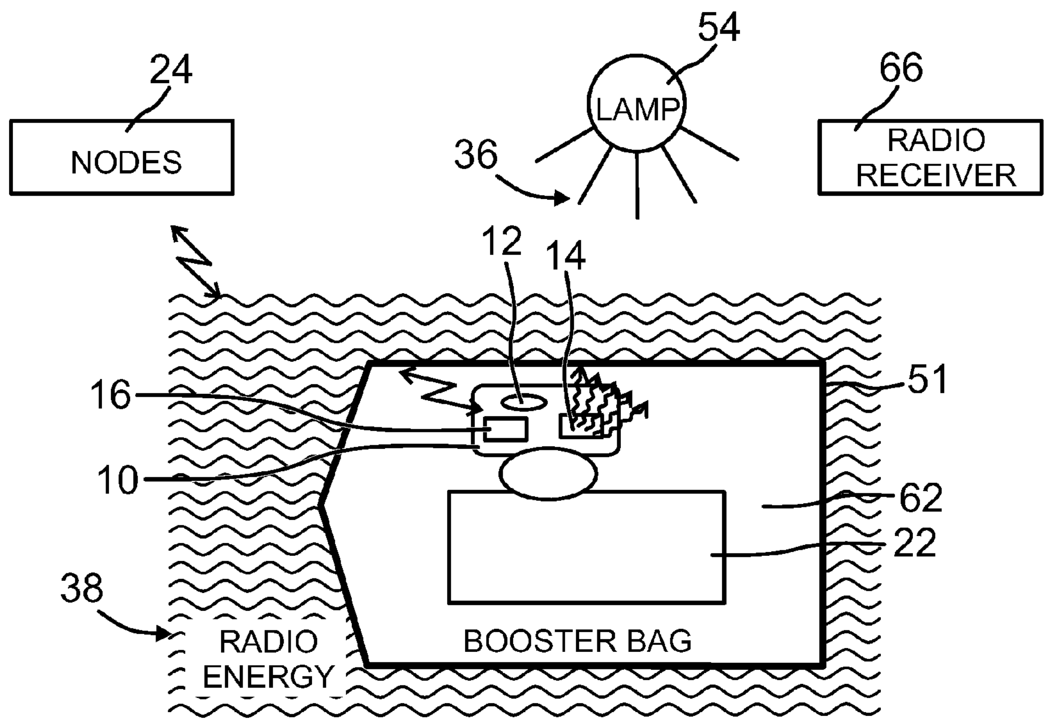
FIG. 8 is a schematic diagram showing one embodiment of an alternate system in accordance with the invention.

FIG. 8. shows how the radio and/or the light radiation source(-s) can be controlled to contain unique information. In the embodiment shown in FIG. 8 the radio unit 14 is a transmitter that is arranged to transmit radio signals to a radio receiver 66. The signal node 24 and the radio receiver 66 may be separated or combined in the same physical device. Light radiation signals 36 are detected and sensed in the light unit 12 of the tag 10.

Figure 7:
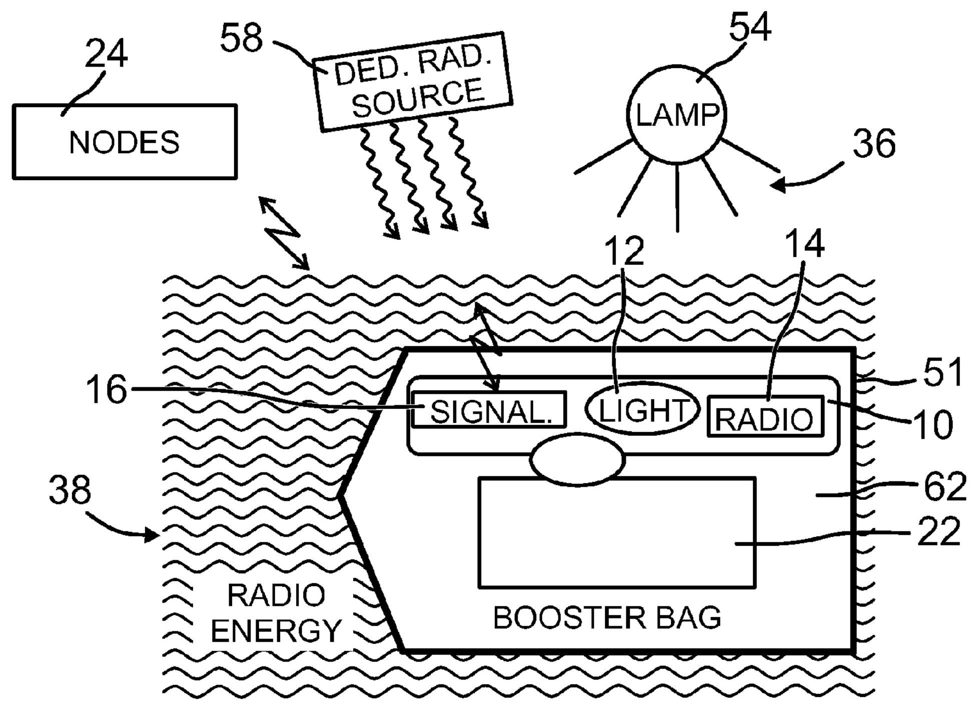
FIG. 7 is a schematic diagram showing one embodiment of a system in accordance with the invention.
Figure 9:
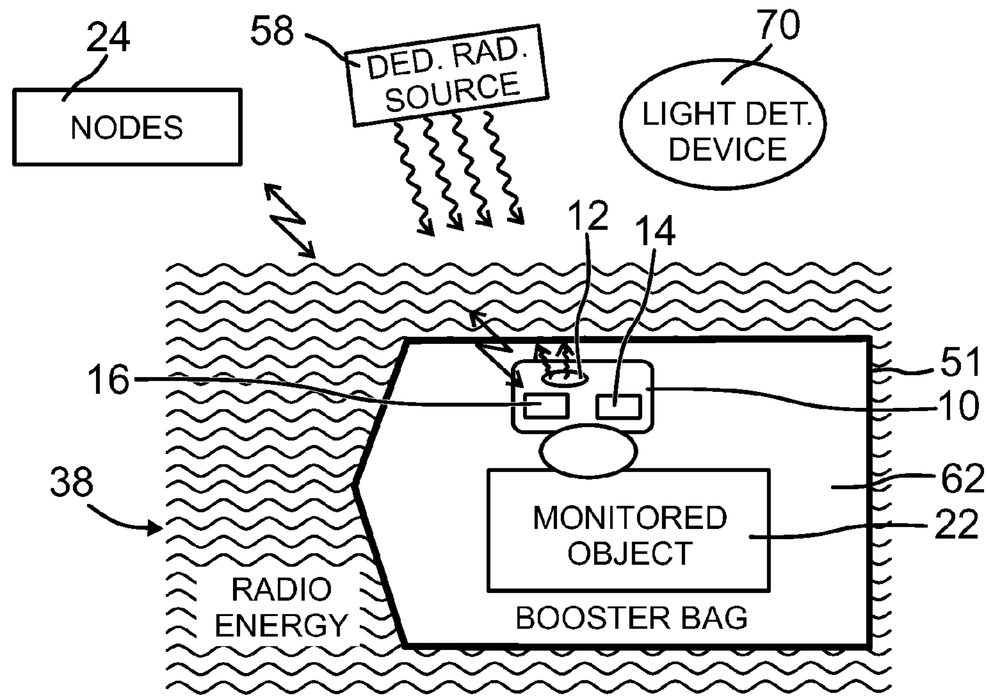
FIG. 9 is a schematic figure showing one alternative embodiment of a system in accordance with the invention.

In the embodiment shown in FIG. 9 a monitored object or product 22 with an attached tag 10 is disposed in a booster bag 51. In the embodiment of FIG. 9, the tag 10 is provided with a light unit 12 emitting light radiation detectable by a remote light radiation detecting device 70. The tag 10 attached to the product 22 is illuminated with ambient radio energy 38 as described in FIGS. 3 and 7. Optionally, the embodiment of FIG. 9 includes the dedicated radiation source(-s) 58 in the form of a radio transmitter emitting a specific frequency. When the light characteristics detected by the remote light radiation detecting device 70 and the characteristics of the radio energy 38 received by the radio unit 14 of the tag 10 are changed in a predetermined manner, the signalling means 16 is activated, for example, to set off an alarm.

Figure 10:
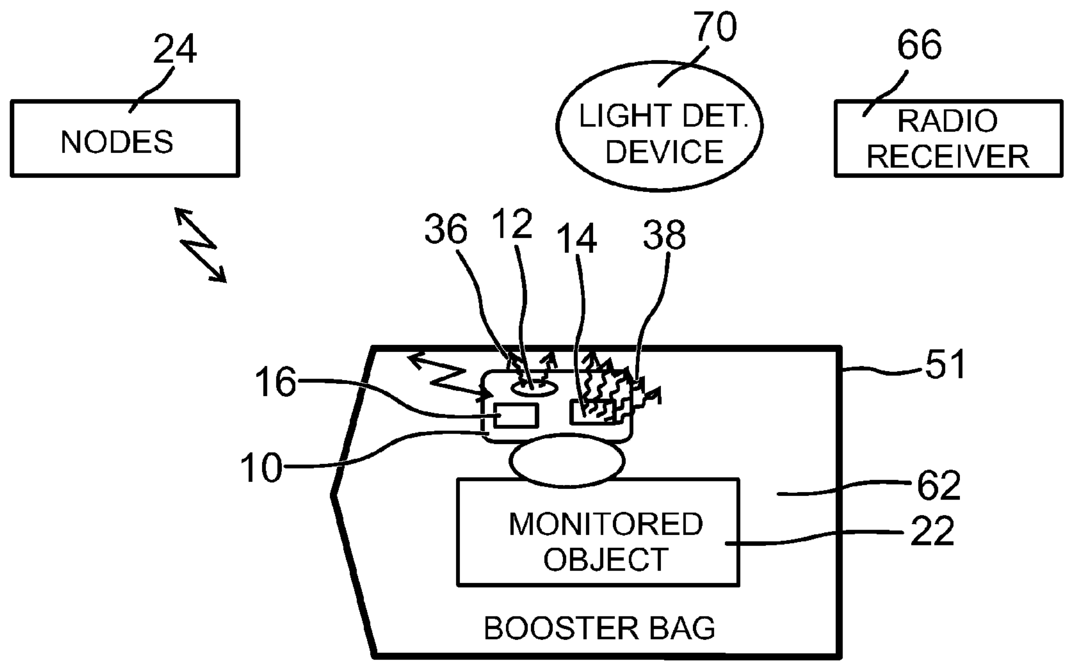
FIG. 10 is a schematic figure showing another alternative embodiment of a system in accordance with the invention.

The embodiment shown in FIG. 10 a monitored object or product 22 with an attached tag 10 is disposed in a booster bag 51. In the embodiment of FIG. 10, the tag 10 is provided with the light unit 12 in the form of a light emitting device for emitting light radiation 36 to the remote light radiation detecting device 70. Further, the tag is provided with the radio unit 14 in the form of a radio transmitter according to the embodiment described with reference to FIG. 8.

Figure 10B:
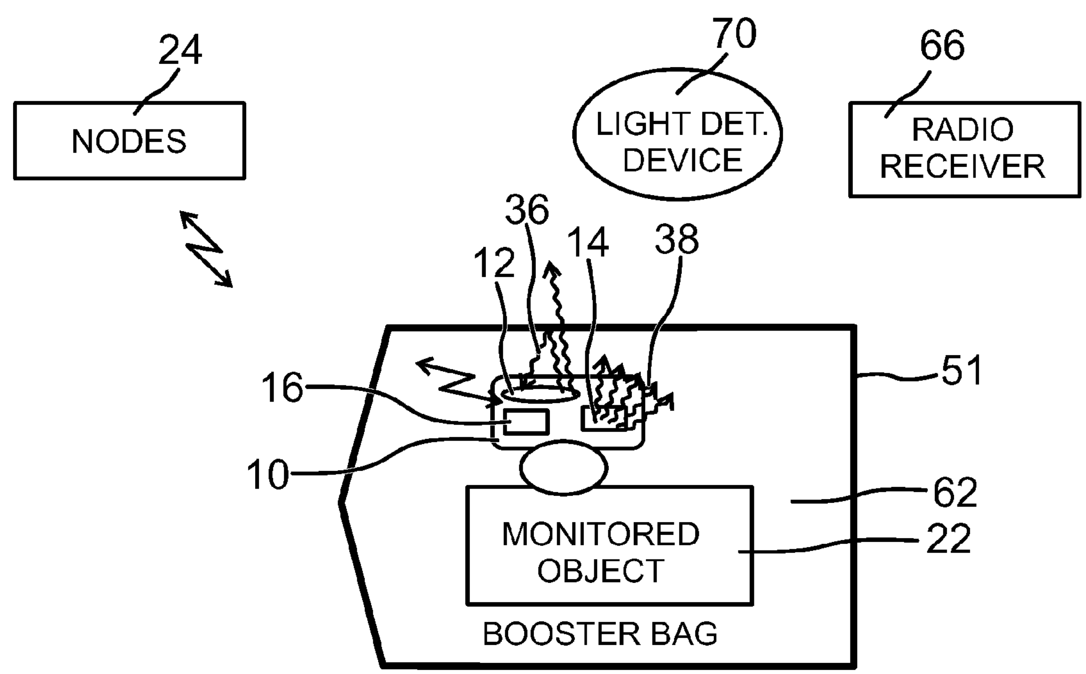
FIG. 10*b* is a schematic figure showing another alternative embodiment of a system in accordance with the invention.

In the embodiment shown in FIG. 10*b* a monitored object or product 22 with an attached tag 10 is disposed in a booster bag 51. In the embodiment of FIG. 10*b*, the tag 10 is provided with the light unit 12 arranged to both transmit and receive light radiation having a predetermined pattern, and the radio unit 14 is arranged to receive or transmit radio radiation according to the embodiments described above and below. Some of the emitted light energy is reflected in the walls of the booster bag, which is measured by the light detector in the tag, while some of the energy passes the wall, which is measured by the external light detector. The variation in light characteristics measured in the tag and in the external unit together with the variation in radio characteristics are used to determine the handling event, which is then communicated by the signalling means 16.

In an alternative embodiment to FIG. 10*b* the tag 10 is provided with the radio unit 14 arranged to both transmit and receive radio radiation having a predetermined pattern, and the light unit 12 is arranged to receive or transmit light radiation according to the embodiments described above and below.

In the embodiment shown in FIG. 11 a monitored object or product 22 with an attached tag 10 is disposed in a booster bag 51. In the embodiment of FIG. 11, the tag 10 is provided with the light unit 12 and the radio receiving means 60. Alternatively, the radio unit 14 in the tag 10 is a receiver and/or the light unit 12 is emitting light. In addition the further unit 19 in the tag 10 is a motion sensor for detecting movements of the monitored object 22. When the light characteristics and the characteristics of the radio energy are changed in a predetermined manner, and movements detected by the motion sensor 19 correspond to predetermined characteristics, the signalling means 16 is activated, for example, to set off an alarm.

Figure 12:
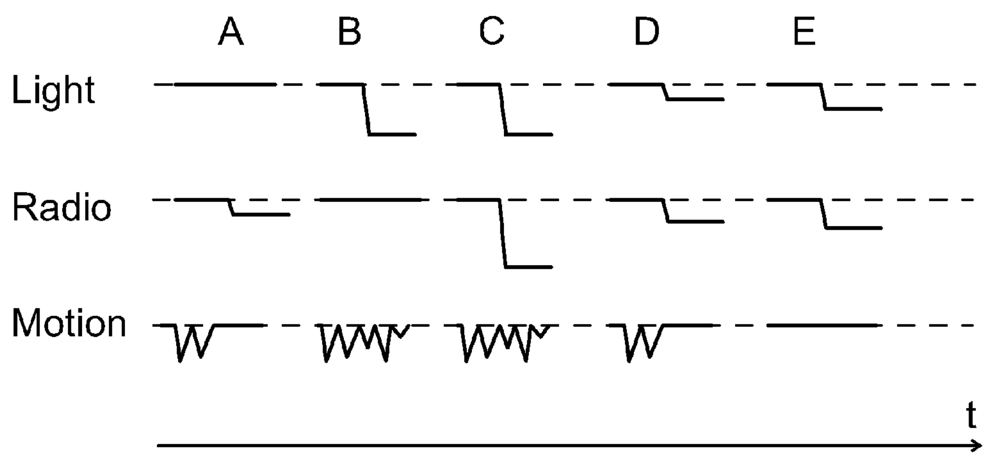
FIG. 12 is a schematic diagram showing light, radio and motion signal variations in the proximity of the device in FIG. 10 during different events.

FIG. 12 shows examples of how radio, light and motion sensor data can be used together to analyze what type of event the object is involved in. The same events as in FIG. 5 are used. The upper graph shows light intensity and the middle graph radio signal strength at different events. The lower graph shows detected movements by the motion sensor 19. At event A the monitored object is placed on a shelf in a store. Light intensity does not change substantially but there could be a decrease in radio signal strength due to absorption in the shelf. At event A motion is detected before change of radio signal strength. However, motion is stopped after a few seconds.

At event B the object is moved, which is detected by the motion sensor 19, and then disposed in a bag, which dramatically changes the intensity of the light measured in the light sensor of the tag. However, there is not a significant change of radio signal strength. Continued motion is, for example, detected if the bag is carried around. At event C the product instead is disposed in a booster bag. As a result both light and radio signal levels in the proximity of the tag are substantially decreased. Motion before signal decrease is detected. The detected motion is, for example, continuous. Event D relates to a situation where the monitored object is hold in hand by a person, wherein the slight decrease in light and radio signals is preceded by detected motion. At event E another object is arranged to partly cover the monitored object, wherein light and radio signal intensity decreases while no motion is detected.

Movements may be sensed by one or several sensors, e.g. a switch (mercury, reed or magnetic), accelerometers, gyro, magnetometer or radio positioning (signal strength, time of arrival, time of departure, or array antennas). The movement detection has dual purposes. First the radio, the processor, the sensors and other energy consuming devices may activated from sleep mode when the protected object is moved, which preserves the energy in the battery. Second the signal sequence from the movement detector is used together with the data sequences from the other sensors to more accurately detect the type of event as described in FIG. 12.

In a further development of the system the exact location of the tagged object may be detected, communicated and analyzed together with the other information related to the event. Thereby may the security cameras in the video system 28 be directed to the place of the event and send cached recordings 10 seconds before and 10 seconds after the event to the display and control units 32 and 34. Many of the sensors suggested above for sensing motion may also be used for localization of the tagged product, particularly radio positioning (signal strength, time of arrival, time of departure, or array antennas), accelerometers, gyro, and magnetometer. Hence, these components may be used for multiple purposes. In some embodiments the tag is a standalone system with its own means to analyze data and take action, e.g. generated sound, light, or vibration; mark or destroys the value of the object by spraying ink or similar; or mark the person handling the object with ink, smelly liquid or synthetic DNA.

The energy source in the tag could be an ordinary battery, a printed battery, or a super capacitor. These could be disposable or rechargeable. Charging may be performed by electronic contacts, coils for induction or using energy harvesting. A photo voltage cell may serve the dual purpose of charging a capacitor or battery and detecting variation in light reaching the tag. The radio may have the triple function of harvesting energy, detecting variation in the radio energy reaching the tag, and transmitting alert information to the receiver nodes.

Any of the tag designs above intended for packaged items could preferably also contain a soft EAS or RFID tag so theft attempts by thieves not using booster bags are detected at the EAS gates at the exits. So called hard EAS tags used on non packed items such as clothes, bags, tools etc could preferably also contain any of the tag designs above so theft attempts by thieves not using booster bags are detected at the EAS gates at the exits. Devices can be added to the tag that prevents and/or indicates and triggers an alarm when the object and tag are separated, e.g. a hard shell around, lanyards, or vacuum packaging.

Many devises for preventing and separation of tag from the product are described in prior art, e.g. switshes, lanyards, hard tags with pins through cloths, Safers, Spider Wrap, and vacuum. The tag may also be provided with a sensor measuring air pressure. If the product and the tag is vacuum packed, the separation of the tag from the product may immediately be detected as described in patent US2008-0252450. In a similar way the tag could comprise other sensors to detect when the tag is being separated from product and/or when the tag and/or the product are being tampered with. The alarms from these are then becoming more efficient since they use the infrastructure of this innovation and furthermore several of the components can have multiple purposes which reduce the cost. In this way the three most common modes of shoplifter behaviour can be instantly detected: just walking out with the alarmed product (EAS), putting the product in a booster bag (light+radio), and separating the EAS tag from the product (air pressure).

The signalling from the tag to the user or to external communication nodes may be done in several ways, e.g. light, sound, vibration, or radio signals. In various embodiments the tag is provided with a buzzer for providing vibrations and a sound that calls the attention of sales representatives, guards and shoppers, and also scares and deters the thieves.

Preferably, the buzzer should be strong enough so it clearly can be heard even when inside a completely closed booster bag. Where sound operated tags are used selective microphones can be provided, e.g. in the ceiling of the store. These relay the alarm to personnel and alarm central for further actions.

As an alternative possibly combined with sound signalling as disclosed above sensitive microphones can be placed in the EAS gates at the exit. Hence, even weak signals can be detected from inside a completely closed booster bag, since the reading distance is short.

In various embodiments that can be combined with the embodiments set out above the tag is provided with a radio transmitter that transmits the alarm to the reader infrastructure before the booster bag is completely closed. As an alternative the transmitter is strong enough so the radio signal can go from inside a completely closed booster bag to a reader placed in the ceiling of the store. Receiving nodes may be placed in the ceiling of the store. As an alternative antennas with high sensitivity are provided at the entrance of the cashier desk. Hence, even weak signals can be detected since the reading distance is short.

The radio transmitter of the tag can also be used to detect when the strength of the radio signal received by the nodes suddenly is reduced. In all embodiments the risk for missed or false alarm can be reduced by building in redundancy with multiple signalling devices and receiving nodes.

In further developed systems in accordance with the invention a transceiver in the tag may relay information from another tag and thereby build a meshed network to improve the reliability of the communication. The vulnerability for jamming, shielding and spoofing can be reduced by frequency hopping, proprietary air interface protocol, and redundancy. Special jamming detectors could also be provided. Nodes 24 of the system can be connected to each other and with one or several computers (servers) in an intelligent network. This further improves the reliability and resilience of the event monitoring and booster bag alarm system and simultaneously facilitates the integration with other systems in the store.

The monitoring system described above can preferably be integrated with other systems commonly used in retail stores for security, customer behaviour monitoring, cashier, enterprise resource planning, inventory control, goods reception etc. in order to enhance the performance, broaden the functionality and thereby improving RoI (Return of Investment) and Benefit/Cost ratios. Some examples, besides the above described integration with the video system, are disclosed below.

The tag can automatically when entering the cashier area report the ID nr of the item it protects to the cashier information system. This information may then be compared to the result of the bar code scan done by the cashier to report the item for payment. If the item not is scanned the cashier is reminded. This process deters and detects “sweet harting”.

The tag could be used to track the tagged product on its journey through the store and report it to an Enterprise Resource Planning (ERP) system used in the facility. As a result the inventory in the store can be made instantly and replenishment be ordered. Misplaced products can readily be replaced. The tracking data may also be used for marketing purposes, e.g. to analyze how customers handle the products and where store personnel places the products. These additional uses of the system and its infrastructure with nodes and servers may be enhanced by providing personnel and voluntary customers with tags, similar to the one placed on the merchandises, so their movements can be tracked and reduce false alarms due to legitimate product handling.

The innovation described above provides at least the following advantages over currently used methods to reduce the risks from thieves using booster bags. Thefts in stores and warehouses are efficiently reduced by more reliable detecting when a thief shields the EAS/RFID tag from being read at the exit gates and faster detect when a potential thief places a product in a pocket or shopping bag to alert the cashier. As a result there will be fewer missed alarms and false alarms.

More reliable alarm makes it possible to achieve increased sales and reduced labour costs since objects and items can be displayed openly for self service and there will be no need to lock them in cabinets to avoid thefts related to booster bags.

Different steps to prevent use of bags do not need to be taken. For instance there is no need to use metal detectors at entrances or exits, no need to ban taking bags, back backs etc. into the store and no need to set up lockers for bags outside the EAS gates.

Other obvious advantages include reduction of labour cost since guards and manual video surveillance can be reduced or concentrated to persons placing packages in their pockets, backpacks or in booster bags or similar shields against electromagnetic waves. The innovation serves the dual purpose of tracing both legitimate and illegitimate handling events of items in the logistics chain including transport, warehouses and retail stores. The system in accordance with the invention preferably can be integrated with other systems in the store, warehouse or transport vehicle, such as video surveillance, cash registers, and inventory replenishment.

While certain illustrative embodiments of the invention have been described in particularity, it will be understood that various other modifications will be readily apparent to those skilled in the art without departing from the scope and spirit of the invention. Accordingly, it is not intended that the scope of the claims appended hereto be limited to the description set forth herein but rather that the claims be construed as encompassing all equivalents of the present invention which are apparent to those skilled in the art to which the invention pertains.

The invention claimed is:

1. A method for monitoring the handling of an object, comprising:

attaching a device to said object, detecting variations of light radiation transmitted between said device and an external light unit arranged outside the proximity of said object, detecting variations of radio waves transmitted between said device and an external radio unit arranged outside the proximity of said object, determining handling event(-s) of said object on the basis of a combination of said variations of light radiation and said variations of radio waves, wherein determining handling event(-s) includes:

determining a profile of said light variations and said radio variations and determining handling event(-s) of said object based on said profile signaling information from said device relating to said handling event(-s).

2. A method in accordance with claim 1, were said signaling is performed by light, sound, vibration, or radio.

3. A method in accordance with claim 2, also including the step of receiving and analyzing said light, sound, vibration, or radio signals in at least one unit arranged outside the proximity of said object.

4. A method in accordance with claim 1 also including steps of determining and storing typical profiles corresponding to specific handling events of said object to be applied before, during or after real time monitoring of the object.

5. A method in accordance with claim 1 comprising sensing ambient light radiation with a light sensitive detector arranged in said device.

6. A method in accordance with claim 1 also comprising detecting when said device being separated from said object and/or when said device and/or said object is being tampered with and determining handling event(-s) of said object based on a combination of said light variations, said radio variations, and the signals from said separation detector.

7. A method in accordance with claim 1 also comprising sensing movements of said object and where the combination of said light variations, said radio variations and said movements are used to determine the handling event(-s) of said object.

8. A system for monitoring the handling of an object comprising:

a device attachable to said object comprising at least one signaling means arranged to communicate information, at least one light sensitive detector arranged to detect variations of light radiation transmitted between said device and an external light unit, at least one radio receiver arranged to detect variations of radio waves transmitted between said device and an external radio unit, analyzing means arranged to determine handling event(-s) of said object based on a combination of said light variations and said radio variations, said analyzing means comprising first analyzing means to form a profile based on a combination of said light variations and said radio variations, and second analyzing means to determine handling event(-s) of said object based on said profile, and means to electronically connect said light sensitive detector, radio receiver, analyzing means, and signaling means.

9. A system in accordance with claim 8 where said signaling means transmits light, sound, vibration, or radio signals.

10. A system in accordance with claim 8, also comprising at least one unit arranged outside the proximity of said object arranged to receive and analyze said light, sound, vibration, or radio signals.

11. A system in accordance with claim 8 also comprising a storing means arranged to store typical profiles corresponding to specific handling events of said object and to store algorithms to be used in the first and second analyzing means to be operated before, during or after real time monitoring of the object.

12. A system in accordance with claim 8, comprising at least one light radiation source arranged in said external light unit to transmit light radiation having a predetermined pattern, and at least one light sensitive detector arranged in said device attached to said object to measure light radiation having said predetermined pattern.

13. A system in accordance with claim 8, also comprising at least one sensor to detect when said device being separated from said object and/or when said device and/or said object is being tampered with and wherein the analyzing means is arranged to determine handling event(-s) of said object based on a combination of said light variations, said radio variations, and the signals from said separation detector.

14. A system in accordance with claim 8, also comprising at least one movement sensor arranged in said device attached on said object to measure movements of said object and where the combination of said light variations, said radio variations and said movements are used to determine the handling event of said object.

15. A device for monitoring the handling of an object comprising:

said device is attachable to said object and comprises at least one light sensitive detector arranged to detect variations of ambient light radiation, at least one radio receiver arranged to detect variations of ambient radio waves, analyzing means arranged to determine handling event(-s) of said object based on a combination of said light variations and said radio variations, said analyzing means comprising first analyzing means to form a profile based on a combination of said light variations and said radio variations, and second analyzing means to determine handling event(-s) of said object based on said profile, and at least one signaling means arranged to communicate information relating to said handling event(-s).

16. A device in accordance with claim 15 where the signaling means is arranged to generate a sound, light or vibration alarm.

17. A device in accordance with claim 15 also comprising at least one sensor to detect when said device being separated from said object and/or when said device and/or said object is being tampered with, and wherein the analyzing means is arranged to determine handling event(-s) of said object based on a combination of said light variations, said radio variations, and the signals from said separation detector.

18. A device in accordance with claim 15 also comprising at least one movement sensor to measure movements of said object and wherein the analyzing means is arranged to determine handling event(-s) of said object based on a combination of said light variations, said radio variations, and said movements.

* * * * *